United States Patent [19]

Anderson

[11] 4,035,752
[45] July 12, 1977

[54] ENERGY SAVING CONTROL

[75] Inventor: James R. Anderson, Minneapolis, Minn.

[73] Assignee: Research, Incorporated, Minneapolis, Minn.

[21] Appl. No.: 592,041

[22] Filed: June 30, 1975

Related U.S. Application Data

[63] Continuation-in-part of Ser. No. 428,062, Dec. 26, 1973, abandoned.

[51] Int. Cl.² .................................. H01H 37/16
[52] U.S. Cl. ........................... 337/107; 337/304; 219/511; 200/38 BA
[58] Field of Search ......... 337/102, 107, 304, 377, 337/141; 219/511, 461, 469; 236/46; 58/9, 13; 200/38 BA, 38 FA, 153 LB

[56] References Cited

U.S. PATENT DOCUMENTS

| | | | |
|---|---|---|---|
| 1,322,216 | 11/1919 | Adams et al. | 58/13 X |
| 2,601,011 | 6/1952 | Wilcox | 219/461 X |
| 2,611,855 | 9/1952 | Turner | 219/511 |
| 3,582,581 | 6/1971 | Hawks | 200/38 FB |
| 3,761,678 | 9/1973 | Eckles | 219/461 |
| 3,821,502 | 6/1974 | Joeckel | 200/153 LB X |
| 3,834,618 | 9/1974 | Buckwalter | 337/304 X |
| 3,849,753 | 11/1974 | Nichols | 337/102 |

FOREIGN PATENT DOCUMENTS 1,248,261  8/1967  Germany

Primary Examiner—George Harris
Attorney, Agent, or Firm—Dugger, Johnson & Westman

[57] ABSTRACT

A device for heating a room or building thermostat by radiant means or a combination of conduction, convection and radiation in such a manner as to cause localized thermal energy in the vicinity of the thermostat. The temperature of the area controlled by the thermostat is thus caused to be reduced by an amount approximately equal to the rise in temperature in the vicinity of the thermostat. The heater, as shown a small light bulb, is switched on by a timer for the time period during which the building or room temperature is to be reduced. The light is turned off when the area temperature is returned to the thermostat setting.

9 Claims, 8 Drawing Figures

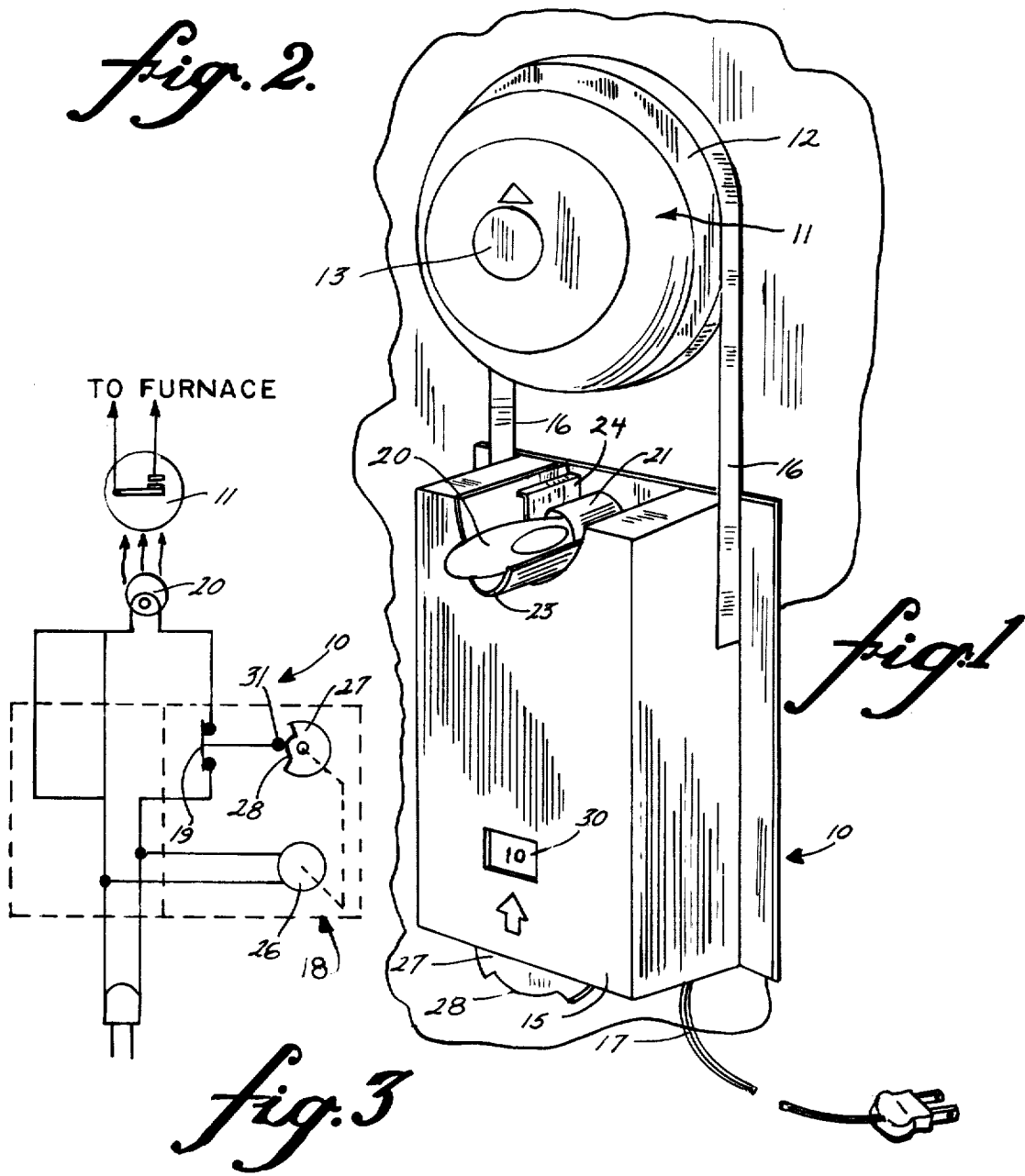

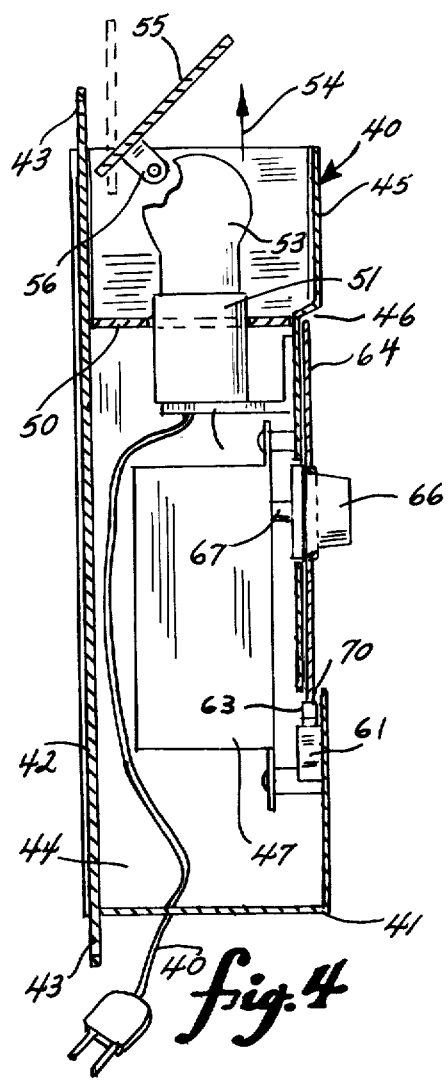
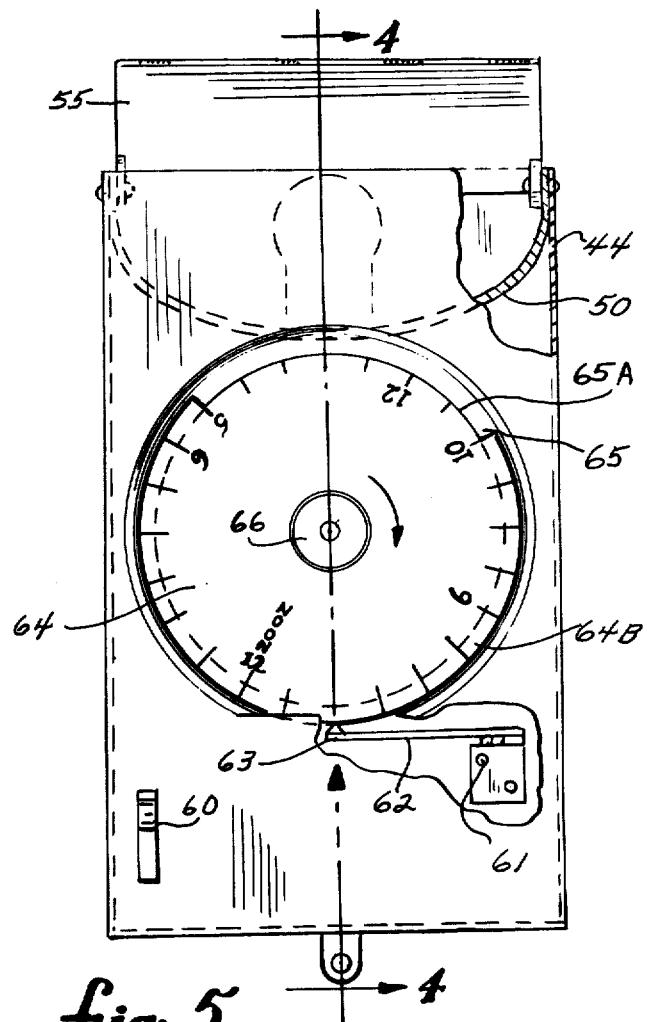
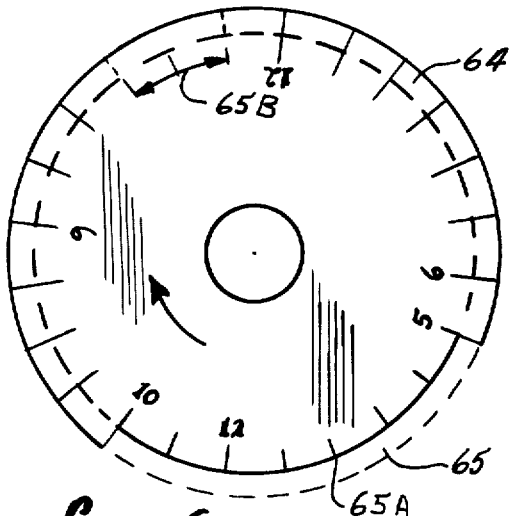
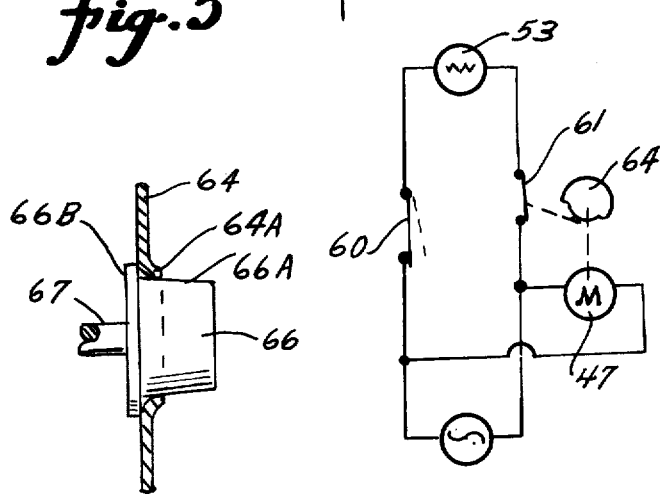
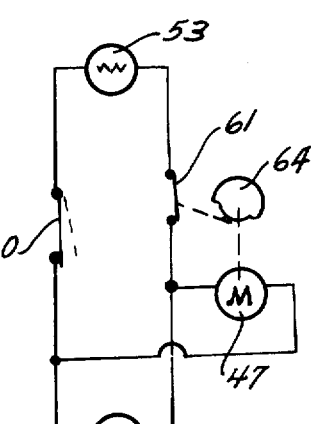

ENERGY SAVING CONTROL

CROSS REFERENCE TO RELATED APPLICATION

This application is a continuation-in-part of my copending application Ser. No. 428,062, filed Dec. 26, 1973 for Energy Saving Control now abandoned.

BACKGROUND OF THE INVENTION

1. Field of the Invention

The present invention relates to a device useful in reducing the temperature of a room or building during preselected times.

2. Prior Art

In the prior art, thermostats have been devised with timers which give the ability to select one temperature for daytime and another for nighttime. These units require permanent installation and they are relatively expensive.

Most home thermostats are relatively low cost units without such timers. At the present time it is recommended that the night temperatures be reduced to conserve energy. The low cost unit described herein provides for automatically depressing the building or room temperature during preselected times.

SUMMARY OF THE INVENTION

The present invention relates to a device which will conserve energy by automatically reducing thermostatically controlled building temperatures during nighttime hours. The device described herein is inexpensive and adaptable to any known thermostat without the need to physically touch the thermostat. It can be installed by the user in a matter of seconds and is readily adjustable as to the hours of reduced building temperature and to the magnitude of the temperature reduction.

The device includes a low power source of heat energy and a timer control to turn on the source of heat energy to locally heat the air around the thermostat to a level higher than the temperature of the main portion of the room or building being heated in response to the thermostatic control.

As shown, a small light bulb used as a heat source is controlled by a timer and the unit is supported adjacent the thermostat.

The magnitude of heating in the vicinity of the thermostat could be adjusted by use of a radiant reflector on the light bulb type heater. If all of the radiant energy is focused on the thermostat, the depression in building temperature would be the greatest. By reflecting this radiant energy away from the thermostat, the nighttime building temperature could be increased. Other means of adjusting the magnitude of the temperature reduction could be adapted, such as controlling the heater voltage by either proportional or time proportional methods or by spacing the heat source at different distances from the thermostat. Also an adjustable deflector may be used as shown in a second form of the invention.

As shown, the heater unit may be suspended from the thermostat by a simple means such as a cable or strap extending from the device over the top of the thermostat such as one would hang a picture on the wall or if desired the unit could be attached to the thermostat or even the wall by the use of adhesive strips.

An override switch may be provided in the circuit to disable the light bulb while permitting the timer to run, as shown in a second form of the invention. Further in the second form of the invention a timing disc that controls a switch can be manually made to provide the desired timing cycle or cycles by cutting away edge portions of the disc to permit the switch being controlled to move to an "on" position. The timing disc is made of thin Mylar plastic which has a center opening pressed onto a slightly tapered timer drive hub to effect a friction drive for the disc. The timing discs can be changed, adjusted or replaced easily without destroying the friction drive. Mylar is a plastic with a "memory" so it does not lose its gripping effect on the hub as time passes. The simple timing disc may be used for controlling other devices in the same manner as existing timer. The present unit provides the means for having a large number of on-off cycles economically and reliably.

This device consumes a small amount of electrical energy to conserve on larger amounts of heating fuels such as gas and oil. The timer used can be a conventional unit operating from a synchronous motor running off home current. Other forms of heaters can be used if desired to provide a low cost easily used energy conserving unit.

BRIEF DESCRIPTION OF THE DRAWINGS

FIG. 1 is a perspective view of a heater unit made according to a first form of the present invention shown installed in relation to a conventional thermostat;

FIG. 2 is a fragmentary sectional view of a reflector used below a heat source in the device of FIG. 1;

FIG. 3 is a schematic representation of a typical operating circuit utilized with the first form of the device of the present invention;

FIG. 4 is a vertical sectional view of a modified form of the present invention;

FIG. 5 is a front view of the device of FIG. 4 with parts broken away;

FIG. 6 is a plan view of a timing disc used with the device of FIG. 4;

FIG. 7 is an enlarged side view of the drive hub for the timer disc of FIG. 6; and FIG. 8 is a schematic representation of the electrical circuit used with the device of FIG. 4.

DESCRIPTION OF THE PREFERRED EMBODIMENTS

The energy saving control illustrated generally at 10 is used for lowering the temperature of a room or building without adjusting the setting of the thermostat. The device comprises a small heater unit shown mounted adjacent to a thermostat 11 which is of conventional design. The thermostat 11 has a base 12, and a rotating adjustable center member 13 for adjusting the temperature setting of the thermostat. The thermostat 11 shown is a typical Honeywell Inc. home thermostat which has suitable bimetallic element control for contacts controlling a furnace (not shown) and operating in a known manner for thermostatic controls.

The control device 10 comprises a case 15, and a supporting strap 16 for supporting the case in close proximity to and below the thermostat. The strap 16 can be an adhesive strap that is attached to the case 15, or it could be any other desired kind of strap. In addition, the case could be attached directly to the wall in a desired position with adhesive tape, or other suitable support means. The case 15 houses a timer member, that is powered through a cord 17 from a home outlet (110 volt AC) and as the timer member 18 (see FIG. 3) operates, it will control a switch 19 to supply power to or shut off a small lamp 20 that is mounted in a suitable lamp base or connector 21.

The lamp 20 is positioned near the top of the case 15, and is positioned above a movable reflector 23. The reflector 23 is part cylindrical, and may be made of polished aluminum to reflect radiant energy upwardly toward the thermostat. The reflector 23 can be slidably mounted as shown in a simple clip 24 that is fixed to the case 15, and provides means for rotationally adjusting the reflector so that the reflected energy from the bulb to the thermostat can be changed as desired for regulating to some extent the amount the room or building temperature is depressed when the lamp is operating. Further, the reflector could be removed, entirely, or slid outwardly or inwardly for different adjustments. A mounting socket to provide full rotation of the reflector can be provided.

Referring specifically to FIG. 3, the timer member 18 as shown closes the switch 19 to the light bulb during a preselected portion of the day.

The timer schematically shows a twenty four hour motor and gear set 26 which is of conventional design and when driving will rotate a cam member 27 that has a recess 28 thereon. As shown, the cam would make one complete revolution in twenty four hours, and the recess 28 has a length equal to a certain number of hours of movement of the cam, which would represent the time during which the room or building temperature should be depressed. For example, a recess length equal to a time period of seven hours could be utilized so that the room temperature would be depressed from approximately 10:30 or 11:00 P.M. at night until some time in the morning.

The setting as shown at 30 in FIG. 1 can be the number of hours from the present time until the light will be turned on.

Other suitable timers can be utilized which include more complex mechanisms, for example a timer that would turn off or turn on the light at particular times of the day and which are adjustable as to the length of time the switch would be closed. Such timers are well known in the art, and for example ordinary kitchen timers could be used. Then the light can merely be connected to the controlled contacts or switch of the timer so that the light would be controlled.

When the recess 28 of the cam reaches the cam follower 31 of the switch 19, the switch 19 will be closed, and power will be supplied to the lamp 20. This will cause the lamp to come on, and create radiant energy or heat in addition to the normal room heat. This heat will be radiated to the thermostat, and the temperature that the thermostat 11 senses will thus be higher than the actual room or building temperature than in the other portions of the room remote from the lamp 20.

The lamp is quite small, but it will serve to falsely depress the room temperature by supplying additional energy to the bimetalic element or other heat sensing element of the thermostat and in that way the room or building temperature will be kept at a lower level than the thermostat indicates. The unit can be installed with any type of thermostat, not merely the form shown, and the concept is to provide a small supply of heat or radiant energy adjacent to a thermostat, which is controlled by a timer so that the room temperature would be depressed during a preselected period of the day to save heating fuel costs.

In an actual model, a 7½ watt bulb positioned 2 to 3 inches below the thermostat serve to depress the temperature of an average size home room approximately 10° when the switch to the lamp was closed.

As the temperature of the building drops because of the localized heat at the thermostat, the energy supplied by the heat source will be lost at a higher rate to the ambient air by conduction, convection and radiation. An equilibrium temperature will be reached at the thermostat whereby the temperature at the thermostat will be slightly lower than the setting thereof and the thermostat will turn on the furnace until the thermostat temperature is raised slightly. The general building temperature will be at a lower level than the thermostat setting because of the heat supplied by the heat source which, as explained, raises the temperature of the thermostat to a level higher than the ambient temperature of the building. The temperature sensed by the thermostat thus is a function of a combination of the building ambient temperature and the heat energy from the heat source.

Referring to FIGS. 4 through 8, and a second form of the invention, an energy saving control unit illustrated generally at 40 includes a housing 41 that has a removable rear wall 42 with mounting tabs 43 at the upper and lower ends thereof. The housing has a pair of side walls 44 and a front wall 45. The front wall 45 has a slightly recessed central region 46, which is used for locating a timing disc as will be explained. A 24 hour timing motor 47 is mounted in the housing and is energized by a line 48 from a home electrical source, as shown schematically in FIG. 8. The housing 41 has a normally open end, comprising the top of the unit when the housing is positioned as shown in FIG. 3, and a reflector shield indicated generally at 50 is mounted between the side walls 44, 44 and spaced below the upper or top edge of the unit. A lamp socket 51 is attached with a bracket 52 to the front wall, in a suitable manner, and the lamp socket 51 extends through a providing opening in the reflector 50. As can be seen, the reflector 50 has a curved lower wall extending in opposite sides of the lamp socket, and a radiant energy source comprising a light bulb 53 is mounted in the socket and thus is positioned on a side of the reflector 50 toward the open end of the housing. The reflector 50 provides a radiant energy reflective surface to reflect the radiant energy from bulb 53 in direction indicated by the arrow 54 (FIG. 4).

In this form of the invention a radiant energy deflector indicated generally at 55 is pivotally mounted on suitable members 56 to the side walls of the housing. The deflector is pivotally mounted and can be moved to partially or substantially completely cover the open end of the housing, or can be pivoted substantially completely out of the way of the radiant energy provided by bulb 53. This alternate position is shown in dotted lines in FIG. 4 for illustrative purposes.

The bulb 53 is connected to the power source through two switches in this form of the invention. An on-off switch indicated generally at 60 is provided for controlling the power to the bulb 53 as an override master control. When the unit is to be used in any manner for depressing room temperatures from the normal thermostat setting, as previously explained, the master switch 60 would be on (closed). If it is desired to keep the room at its normal temperature as level as set by the thermostat during times when the setback effect is usually desired, such as nighttime hours, the master switch 60 can be turned to the off position and even if the timer control switch, as will be more fully explained, is closed, the bulb 53 will still not be energized. Thus if a party is being held, for example, the temperature setback effects can be avoided without unplugging the unit or readjusting the timer. The power to the bulb 53 is also controlled through a timer controlled microswitch 61 mounted to the front wall of the housing as shown in FIGS. 4 and 5, and has an actuating lever 62 mounted thereon that extends generally toward the center portions of the front wall of the housing. The actuating lever 62 has a small cam follower end portion 63 that is positioned to ride against the edge cam disc 64 whenever the switch is to be opened, (the switch 61 is a normally closed switch) and as shown the cam disc 64 has recessed portions or actuating edge portions 65 that are spaced in from the normal edge of the disc a sufficient distance to permit the cam follower 61 to move radially inwardly and permit the switch 61 to move to its normally closed position.

The cam disc 64 is mounted onto a hub 66 that in turn is drivably mounted onto an output shaft 67 of the timer motor 47. The cam disc is made of Mylar material or similar plastic material that has a long "memory", that is, it will yield but will tend to return to its original shape even after extended use in its deformed shape. The hub 66 is made to have a slightly tapered outer surface 66A, and the cam disc 64 is provided with a central aperture that is of slightly smaller diameter than the base portion of the hub 66, so that the cam disc 64 can be slid onto the hub and then pushed along the tapered surface so that it frictionally grips the tapered surface. In actuality the portions of the cam disc 64 surrounding the central opening will deflect or bend outwardly as shown at 64A in FIG. 7, and the portion 64A will tend to return to normal position, thus exerting a frictional gripping force against the outer surface 66A of the hub. The hub 66 includes a flange 66B at the rear portion that provides a stop to prevent the disc 64 from being pushed too far onto the hub. The taper of the hub is small enough so the disc 64 does not tend to pop off the hub during use.

The cam disc 64 fits into the recess 46 of the front wall of the housing, and at the lower portion of this recess, a slot 70 is cut into the wall forming the recess to permit the edge portion of the cam disc to extend into the interior of the housing and engage the cam follower 63. The engagement of the cam follower 63 with the edge 64B of the cam disc 64 is shown in FIG. 5. The scale of the width of the slot 70 in FIG. 4 is somewhat larger than actual for sake of clarity.

As stated previously, the timer motor 47 is a 24 hour motor. That means that shaft 67 will make a one revolution every 24 hours. This permits controlling the switch 61 through several on-off cycles at different times during a day. The Mylar cam disc 64 is marked off into equal 1 hour increments around its periphery. For sake of clarity, these marks are shown, but only selected numerals are illustrated. When plugged in, the motor 47 will be running continually and the time can be set placing the correct time on the cam disc in alignment with an indicator shown as an arrowhead in FIG. 5 which is aligned with the cam follower 63. The motor 47 and the cam disc are then properly synchronized in relation to the switch control. The cam disc can be manually rotated with respect to the hub 66 because the frictional force exerted by the cam disc portion 64A is not great enough to prevent movement of the disc manually, but is great enough to permit the hub to drive the disc through its normal cycle.

The Mylar cam disc is thin enough so it can be cut with a scissor, and is on the order of 10-12 mils thick, which also gives it sufficient rigidity for satisfactory operation. To provide action for operating switch 61 the edge portion of the disc can be cut away to a depth indicated on the disc itself by a dotted line that goes around the disc as shown in FIGS. 5 and 6, in the time frame desired. Stated another way, in order to energize the bulb 53 at the desired time, all that is needed is to cut back the edge portion of the disc 64 as shown at 65 during the desired times. A radial cut is made at each end of the desired recess, and disc is cut along the dotted line between the ends of the recess. With the disc rotating in the direction as indicated by the arrow in FIGS. 5 and 6, if the energy saving control is to be placed on during nighttime hours, the notch 65 can be started at about approximately 10:00 P.M., as shown (assuming retiring about 11:00 P.M.) and cut back so that the edge shown at 65A that would generally follow the dotted line shown on the disc, and the notch would be ended at approximately 5:00 A.M. to deenergize the bulb at that time, and to permit the thermostat to bring the room temperature back up to the thermostat setting before the occupants get up (about 1 hour is needed). With this plastic timing disc, and the ability to cut notches for controlling the cam follower 63 in a desired manner with ease, the disc can be made to include additional periods for operation of the switch 61 as shown by the double arrow 65B in FIG. 6. If all members of the household work, the cam disc can be formed to energize the radiant energy source or bulb 53 during hours when people work, for example from 8:00 A.M. to 4:00 or 5:00 P.M. Again the disc should be cut to allow for lag in the reducing of building temperature and raising the temperature.

Additionally, a separate disc 64 could be used for heat control during weekdays, and a separate disc formed for different periods of temperature setback could be used for weekends, when the hours of room temperature depression may be different from those of a normal work day.

The energy saving control can be used in combination with air conditioning for controlling the temperature of the building. An air conditioning unit is means for controlling the heat of the building, and in order to use the energy saving control with an air conditioner all that has to be done is to set the thermostat at a higher setting than that desired for the normal room temperature, and turn on the energy saving control during the time when the room temperature is to be depressed, that is, when one would normally want the air conditioner working. The setting of the thermostat may be 5° to 8° above the desired temperature when the room or building is occupied.

The cam discs permit the cycling on and off of the energy saving control 53, at desired intervals throughout the day, and because the cam disc can be easily replaced on the hub 66, and are easy to cut for desired operation a wide variety of different control sequences can be carried out.

It is of course apparent that the switch 61 could be used to control other systems, for turning on and off the lights of a home when the residents are not at home to make it appear that someone is there. On and off cycles can be repeated throughout the day with the frequency desired.

The adjustable deflector 55 (it is also an adjustable reflector) permits adjusting the amount of radiant energy being provided to the thermostat. It should be noted that the device of the present invention can be adjustably mounted below the thermostat, or above the thermostat. It has been found that mounting the unit above the thermostat so that the radiant energy radiates downwardly onto the thermostat provides more precise control because all effects of convection are eliminated. The deflector 55 can be used in either type of mounting for intercepting not only the radiant energy but when the unit is below the adjacent thermostat also for deflecting any convective heat that might be present away from the thermostat. Such convective heat may be present from the timer motor for example. The deflector 55 aids in insuring that most of the heat reaching the thermostat is radiant energy when the deflector is partially open as shown in FIG. 4.

The housing design in the second form of the invention has no exposed mechanism except for the Mylar disc. The units or housings can be supported through adjustable straps on the thermostat, adhesive strips on the wall, screws or nails, or other ways. Also, the timer could be separated from the radiant energy source, which would also eliminate any convective effects from heat generated by the timer motor.

What is claimed is:

1. An attachment for use with an existing thermostat control to conserve energy by altering thermostatically controlled building temperatures without changing the setting of the control during preselected time period including a housing, a radiant energy source mounted in said housing and being separate from the thermostat control, means to permit positioning said radiant energy source adjacent to an existing thermostat control without substantially normally blocking radiant energy transmission to the thermostat, said radiant energy source providing sufficient radiant energy when energized to elevate the temperature of an adjacent thermostat control above the ambient temperature of the building portion controlled by the thermostat control, and timer control means separate from the thermostat control to control energization of said radiant energy source whereby said radiant energy source is controlled by said timer independently of room temperature to respond in a preselected manner during preselected period of time, wherein said timer control means includes a timer motor, a timer cam and a timer cam controlled switch mounted on said housing adjacent said timer cam and having a movable switch control element, a drive hub driven by said timer motor, said timer cam comprising a disc driven by said hub and having an edge portion controlling movement of said switch control element, said disc being made of plastic material manually cuttable with shears at least adjacent its edge portion to form cam shapes at its edge portion to cause movement of said switch control element between on and off positions.

2. The combination as specified in claim 1 wherein said radiant energy source comprises an electric light bulb.

3. The combination of claim 1 and a reflector, means to mount said reflector on said housing adjacent said radiant energy source to reflect radiant energy from said radiant energy source toward an adjacent thermostat.

4. The combination of claim 4 wherein said means to mount said reflector includes means to permit adjustment of said reflector.

5. The combination of claim 1 and a manually operable switch controlling power to said radiant energy source to disable said radiant energy source without affecting said timer.

6. The device of claim 1 wherein said hub has a tapered outer surface, and said disc is made of a plastic material, said disc havng a central aperture of size to frictionally fit onto the tapered hub.

7. A new power timer controlled radiant energy unit for use with and for mounting separate from an existing thermostat used for controlling temperature of a building, said radiant energy unit including a housing, an electrically powered radiant energy source, means mounting said radiant energy source on said housing in position to normally expose the radiant energy source directly to the exterior of said housing, means to support said housing in position adjacent to a thermostat so that when energized said radiant energy source normally directs radiant energy toward and locally elevates the temperature at an adjacent thermostat to a level above the normal ambient temperature of an area controlled by the adjacent thermostat, means separate from power connections to the adjacent thermostat to permit energizing said radiant energy source only at preselected times such as nighttime hours including a timer having a driven hub with an outer surface that opens from an inner end to a smaller outer end at a gentle taper angle, a cam disc comprising a thin sheet of plastic material having the memory properties of Mylar having a center opening and a peripheral edge, said center opening being of slightly smaller size than the inner end of said hub so that as said disc is pushed onto said hub to the inner end the portion of the disc adjacent said center opening deforms outwardly and frictionally engages the outer surface of said hub to effect a driving engagement between said hub and said disc.

8. A device for controlling energization of electrical sources, such as radiant energy sources including a timer motor, a drive hub driven by said timer motor, said drive hub having a slightly tapered outer surface increasing in size from an outer end toward an inner end, a timer disc cam made of plastic sheet material having substantially the memory properties of Mylar, said timer disc cam having a central aperture of slightly smaller size than the largest size portion of said hub whereby said aperture may be placed over said hub and the disc cam may be forced onto said tapered hub and thereby frictionally driven by said hub, and a switch positioned to be responsive to the edge configuration of said timer disc cam, said timer disc cam having edge portions manually cuttable with shears to form cam configurations for controlling said switch.

9. The combination as specified in claim 1 and an adjustable radiant energy deflector mounted on said housing between said radiant energy source and an adjacent thermostat.

* * * * *